United States Patent
Zoitos et al.

(10) Patent No.: US 10,745,571 B2
(45) Date of Patent: Aug. 18, 2020

(54) FIRE PROTECTIVE COMPOSITIONS AND ASSOCIATED METHODS

(71) Applicant: Unifrax I LLC, Tonawanda, NY (US)

(72) Inventors: Bruce K. Zoitos, Williamsville, NY (US); Jonathan Cross, Warrington (GB); Adam Kelsall, Northwich (GB); Chad D. Cannan, Lancaster, NY (US); Kenneth B. Miller, Lockport, NY (US); Gary A. Lee, Lockport, NY (US); Mark E. Beauharnois, Lockport, NY (US); Anastasia Keefe, Williamsville, NY (US); Donald John Daniels, IV, Amherst, NY (US)

(73) Assignee: Unifrax I LLC, Tonawanda, NY (US)

( * ) Notice: Subject to any disclaimer, the term of this patent is extended or adjusted under 35 U.S.C. 154(b) by 0 days.

(21) Appl. No.: 16/415,739

(22) Filed: May 17, 2019

(65) Prior Publication Data

US 2019/0352515 A1 Nov. 21, 2019

Related U.S. Application Data

(60) Provisional application No. 62/673,288, filed on May 18, 2018.

(51) Int. Cl.
| | | |
|---|---|---|
| *C09D 5/18* | (2006.01) | |
| *C09K 21/10* | (2006.01) | |
| *C09K 21/14* | (2006.01) | |
| *C09K 21/02* | (2006.01) | |

(52) U.S. Cl.
CPC .............. *C09D 5/18* (2013.01); *C09K 21/02* (2013.01); *C09K 21/10* (2013.01); *C09K 21/14* (2013.01)

(58) Field of Classification Search
CPC .......... C09D 5/18; C09K 21/02; C09K 21/10; C09K 21/14
See application file for complete search history.

(56) References Cited

U.S. PATENT DOCUMENTS

| | | |
|---|---|---|
| 5,132,030 A | 7/1992 | Marx |
| 5,332,699 A | 7/1994 | Olds et al. |
| 5,585,312 A | 12/1996 | TenEyck et al. |
| 5,714,421 A | 2/1998 | Olds et al. |
| 5,811,360 A | 9/1998 | Jubb |
| 5,821,183 A | 10/1998 | Jubb |
| 5,874,375 A | 2/1999 | Zoitos et al. |
| 5,928,075 A | 7/1999 | Miya et al. |
| 5,955,389 A | 9/1999 | Jubb |
| 6,025,288 A | 2/2000 | Zoitos et al. |
| 6,030,910 A | 2/2000 | Zoitos et al. |
| 6,708,822 B1 | 3/2004 | Muni |
| 6,861,381 B1 | 3/2005 | Jubb et al. |
| 6,953,757 B2 | 10/2005 | Zoitos et al. |
| 7,153,796 B2 | 12/2006 | Jubb et al. |
| 7,259,118 B2 | 8/2007 | Jubb et al. |
| 8,263,512 B2 * | 9/2012 | Fernando .................. C09D 1/04 501/95.2 |
| 8,404,328 B2 * | 3/2013 | Sato ....................... C04B 35/565 156/89.22 |
| 8,524,125 B2 * | 9/2013 | Mazor .................... C09K 21/08 252/601 |
| 8,729,155 B2 * | 5/2014 | Wierzbicki ............ C09K 21/02 523/179 |
| 2015/0175477 A1 | 6/2015 | Zhao et al. |
| 2016/0069124 A1 | 3/2016 | Mendoza et al. |
| 2017/0073059 A1 | 3/2017 | Fernando et al. |
| 2017/0349769 A1 | 12/2017 | Geise et al. |

FOREIGN PATENT DOCUMENTS

| | | | |
|---|---|---|---|
| EP | 0253221 A2 | 7/1987 | |
| EP | 2341083 B1 | 7/2015 | |
| JP | 6276231 B2 | 2/2018 | |
| WO | WO-2016016385 A1 * | 2/2016 | ........... C04B 28/006 |

OTHER PUBLICATIONS

International Search Report and Written Opinion received in International Application No. PCT/US2019/032878, dated Jul. 25, 2019, 8 pages.

* cited by examiner

*Primary Examiner* — Anthony J Green
(74) *Attorney, Agent, or Firm* — Haynes and Boone, LLP

(57) ABSTRACT

Fire protective compositions include colloidal silica solids, clay, a low biopersistence fiber or refractory ceramic fiber, water, and optionally a chelating agent. Methods of using the fire protective compositions include providing a polymeric foam substrate, applying the fire protective composition on the polymeric foam substrate, and allowing the fire protective composition to dry.

23 Claims, 14 Drawing Sheets

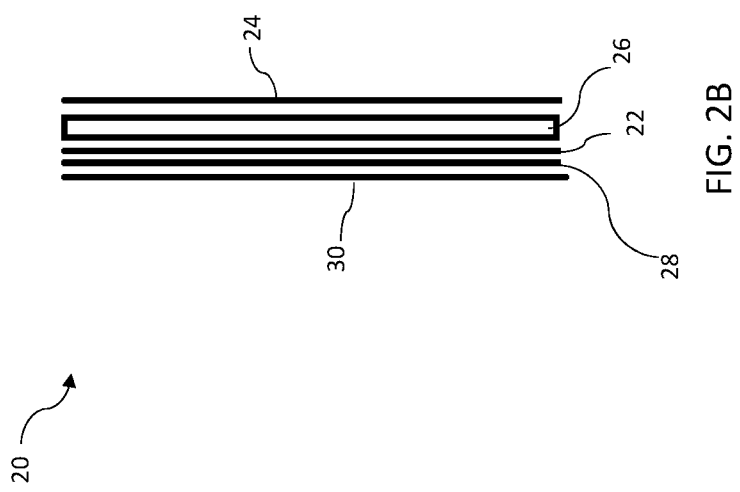

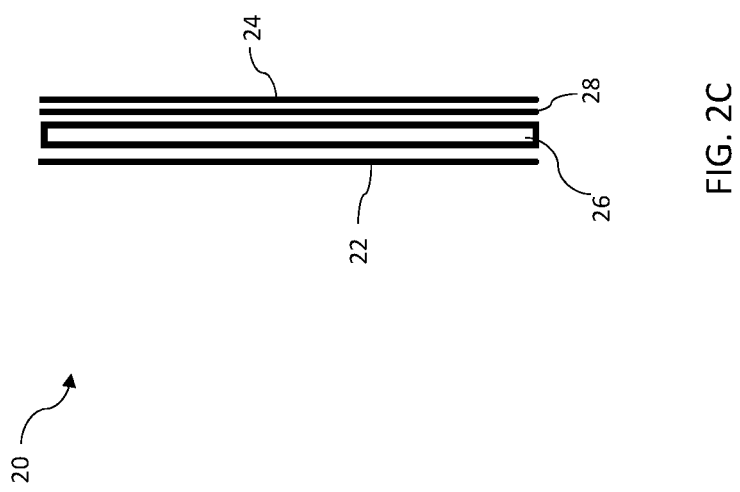

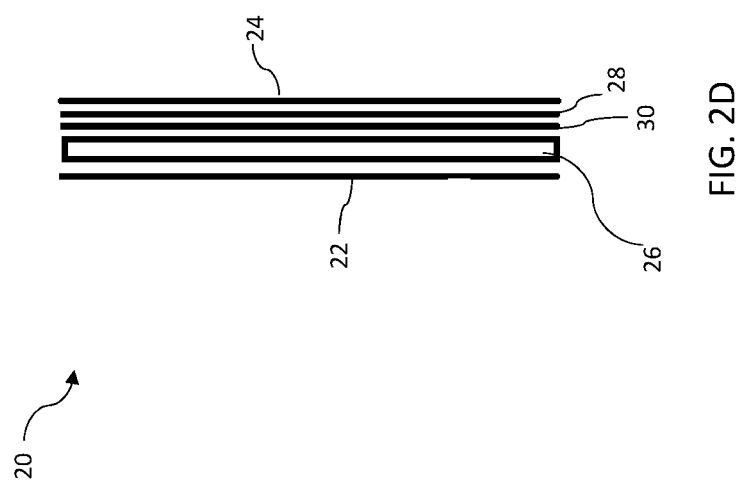

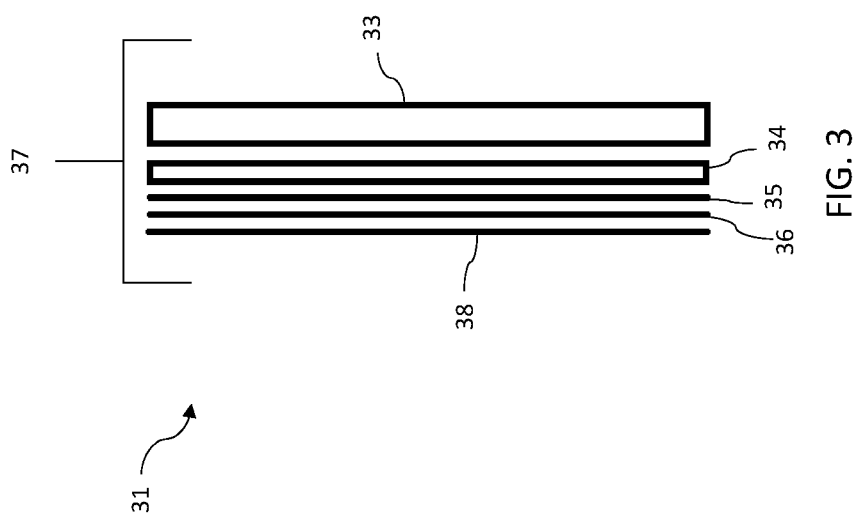

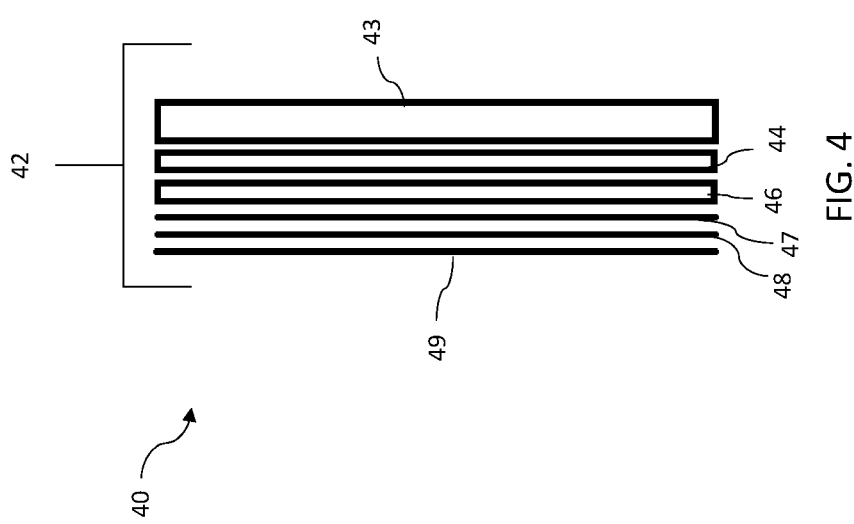

FIRE PROTECTIVE COMPOSITIONS AND ASSOCIATED METHODS

CROSS-REFERENCE TO RELATED APPLICATIONS

This application claims priority to U.S. Provisional Application No. 62/673,288 filed May 18, 2018, entitled "Fire Protected Building Components and Building Systems," the disclosure of which is hereby incorporated by reference in its entirety.

BACKGROUND

The present disclosure relates generally to fire protective compositions and methods. In particular, the present disclosure describes fire protective coatings that impart fire resistance to combustible insulation boards and architectural panels, and building systems that include the fire protected insulation boards and architectural panels.

Polymeric foam insulation boards, such as expanded or extruded polystyrene insulation boards, are known in the art to provide thermal insulation to wall systems. Multiple layer architectural insulation panels including an insulation layer sandwiched between outer metal layers are also used to impart thermal insulation to building walls in commercial, industrial and residential buildings. Many of the polymers used to manufacture the insulation boards, however, in particular polystyrene, are flammable. If a wall overheats or catches fire, a polymeric insulation board provides a ready source of fuel for the fire, as well as a source of toxic and/or noxious chemicals if burned. The combustible polymeric insulation boards also provide a route for the spread of flames across a building surface during a fire event.

Thus, there is a continuing need for improved materials and methods that are more resistant to fire.

BRIEF DESCRIPTION OF THE DRAWINGS

The following figures are included to illustrate certain aspects of the present invention, and should not be viewed as an exclusive embodiment. The subject matter disclosed is capable of considerable modification, alteration, and equivalents in form and function, as will occur to those of ordinary skill in the art and having the benefit of this disclosure.

FIG. 2B illustrates a side view of a fire-resistant architectural panel according to embodiments of the present disclosure;

FIG. 2C illustrates a side view of a fire-resistant architectural panel according to embodiments of the present disclosure;

FIG. 2D illustrates a side view of a fire-resistant architectural panel according to embodiments of the present disclosure;

FIG. 3 illustrates a side view of a building wall structure including a fire-resistant polymeric foam insulation board according to embodiments of the present disclosure;

FIG. 4 illustrates a side view of a building wall structure including a fire-resistant polymeric foam insulation board according to embodiments of the present disclosure;

DETAILED DESCRIPTION

Figure 1A:
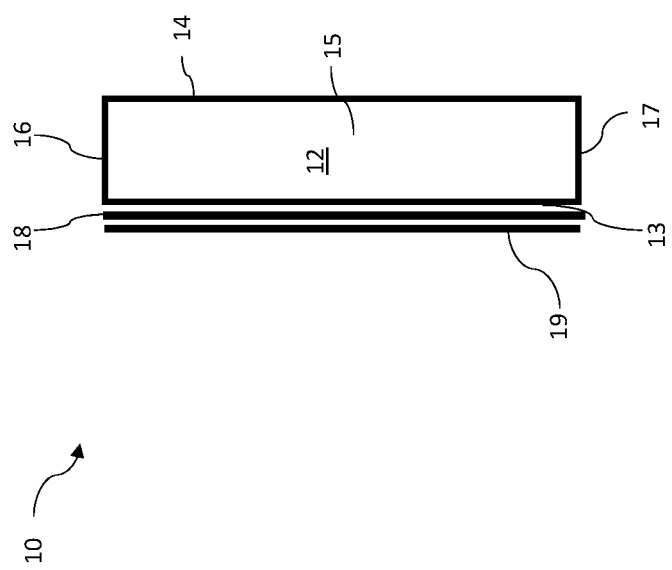
FIG. 1A illustrates a side view of a fire-resistant polymeric foam insulation board according to embodiments of the present disclosure.

The present disclosure describes fire protective compositions and materials that include the fire protective compositions. Such materials include building components, including polymeric insulation boards and architectural panels.

Advantageously, the fire protective compositions include high temperature resistant coating compositions or coating systems that impart or increase the fire resistance of a combustible material. As described further below, the coating composition can include high temperature resistant inorganic fibers and/or high temperature resistant inorganic mineral particles/platelets in combination with a binder.

Fire Protective Compositions

The term "fire protective composition(s)," as used herein means a composition that is capable of imparting fire protection or resistance to a building component, material or structure, or that is capable of improving or increasing the fire resistance of a building component, material or structure, as compared to the fire resistance of the same building component, material or structure without the fire protective composition. According to certain embodiments, the fire protective composition improves the test performance of a building component, material or structure when tested in accordance with the testing methods set forth in the NFPA-285, Standard Fire Test Method for Evaluation of Fire Propagation Characteristics of Exterior Wall Assemblies Containing Combustible Components as compared to the same building component, material or structure without the fire protective composition. According to various embodiments, the fire protective composition improves the test performance of a building component, material or structure when tested in accordance with the testing methods set forth in the NFPA-286, Standard Methods of Fire Tests for Evaluating Contribution of Wall and Ceiling Interior Finish to Room Fire Growth as compared to the same building component, material or structure without the fire protective composition. Generally, the fire protective composition includes at least (i) a binder and (ii) inorganic fibers and/or inorganic mineral particles or platelets.

Binder

In some embodiments, the binder includes an inorganic binder, such as a hydraulic cementitious binder. As used herein, the term "cementitious" or "cement" refers to any hydraulic cement. Hydraulic cementitious binders are materials that set and harden in the presence of water. Suitable non-limiting examples of hydraulic cements include Portland cement, masonry cement, alumina cement, refractory cement, calcium aluminate cement, calcium sulfoaluminate cement, ground granulated blast furnace slag, natural cement, and mixtures thereof. Portland cement, as used in the trade, means a hydraulic cement produced by pulverizing clinker, including hydraulic calcium silicates, calcium aluminates, and calcium ferroaluminates, with one or more of the forms of calcium sulfate as an interground addition. Portland cements according to ASTM C150 are classified as types I, II, III, IV, or V. By way of illustration, but not limitation, the cementitious binder may be selected from hydraulic cements, such as Portland cement, non-hydraulic cements, such as lime, gypsum, or oxychloride cements, or combinations thereof. The inorganic binder may include a single type of inorganic binder or a blend of more than one type of inorganic binder.

Suitable inorganic binders that may be included in the fire protective composition include colloidal alumina, colloidal silica, colloidal zirconia, and mixtures thereof. Colloidal silica binder is present in an amount of about 15 weight percent to about 20 weight percent of the dry product. Colloidal silica solids are present in an amount of about 11 weight percent to about 14 weight percent of the wet product. Colloidal silica solution (consisting of colloidal silica solids suspended in a water-based solution) is present in an amount of about 30 weight percent to about 40 weight percent of the wet product.

In exemplary embodiments, the colloidal silica has a particle size of between about 10 to about 30 nm and includes from about 20 weight percent to 45 weight percent silica in water. The pH of the colloidal silica can range anywhere from about 2 to about 10. One suitable colloidal silica is Nalco 1141 colloidal silica, which is a colloidal silica with a particle size of 15 nm, includes 40 weight percent silica in water, and has a pH of 9.7. Another suitable colloidal silica is Nalco 1034a colloidal silica, which is a colloidal silica with a particle size of 20 nm, includes 34 weight percent silica in water, and has a pH of 2.8.

Inorganic Fibers

In several embodiments, the fire protective composition includes inorganic fibers. Any heat-resistant inorganic fibers may be utilized in the fire protective composition so long as the fibers can be formulated into a suitable product form such as a coating composition, and can impart the desired or required fire protection or fire resistance to a combustible building component, material or structure, such as a polymeric insulation board. By way of illustration, and without limitation, suitable inorganic fibers that may be used to prepare the fire protective composition include (i) rock wool fibers, (ii) slag wool fibers, (iii) mineral wool fibers, (iv) high alumina polycrystalline fibers, (v) refractory ceramic fibers such as alumino-silicate fibers, (vi) alumina-magnesia-silica fibers, (vii) kaolin fibers, (viii) alkaline earth silicate fibers (also known as low biopersistence fibers) such as calcia-magnesia-silica fibers and magnesia-silica fibers, (ix) glass fibers such as S-glass fibers, S2-glass fibers, and E-glass fibers, (x) quartz fibers, (xi) silica fibers and combinations thereof. Inorganic fibers are present in an amount of about 75 weight percent to about 85 weight percent of the dry product and are present in an amount of about 50 weight percent to about 55 weight percent of the wet product. According to various embodiments, the heat resistant inorganic fibers include refractory ceramic fibers (RCF). Without limitation, suitable RCFs include alumina fibers, alumina-silica fibers, alumina-zirconia-silica fibers, zirconia-silica fibers, zirconia fibers and similar fibers.

A useful alumina-silica ceramic fiber is commercially available from Unifrax I LLC (Tonawanda, N.Y., USA) under the registered trademark FIBERFRAX®. The FIBERFRAX® ceramic fibers include the fiberization product of about 40 to about 75 weight percent alumina and about 25 to about 60 weight percent silica. According to certain embodiments, the ceramic fibers include about 29 weight percent to about 55 weight percent alumina and about 45 weight percent to about 60 weight percent silica. The FIBERFRAX® fibers exhibit operating temperatures of up to about 1540° C. and a melting point up to about 1870° C. The alumina/silica fiber may include from about 40 weight percent to about 60 weight percent $Al_2O_3$ and about 60 weight percent to about 40 weight percent $SiO_2$. In one embodiment, the fiber includes about 50 weight percent $Al_2O_3$ and about 50 weight percent $SiO_2$.

In some cases, fibers may contain unfiberized particulate material, referred to in the industry as "shot." Shot has a particle size of about 45 microns up to several mm and may be in excess of 50 percent of the overall material mass. Shot does not contribute to thermal insulation properties.

In some embodiments, shot may be removed from the fiber or reduced in size by milling. In cases where the shot is removed, it may be removed either completely or partially. Shot may be removed from the fiber by sieving, an air classifying process (air cyclone) or by a water-based process (hydro cyclone).

In cases where the shot is reduced in size, it may be reduced by any suitable milling process such as hammer milling, attrition milling or ball milling. In some cases, shot may be milled to an extent that most particles have a diameter less than about 45 microns.

Fiber length may be reduced by milling processes such as hammer milling, attrition milling or ball milling. In these cases, fiber length may be reduced to levels as low as about 10 microns to 100 microns or lower.

Biosoluble alkaline earth silicate fibers (or low biopersistence fibers) may also be used to prepare the fire protective composition. Suitable biosoluble earth silicate fibers include those fibers disclosed in U.S. Pat. Nos. 6,953,757, 6,030,910, 6,025,288, 5,874,375, 5,585,312, 5,332,699, 5,714,421, 7,259,118, 7,153,796, 6,861,381, 5,955,389, 5,928,075, 5,821,183, and 5,811,360, the entire disclosures of which are incorporated herein by reference.

The phrase "low biopersistence fibers" refers to fibers that are soluble or otherwise decomposable in a physiological medium or in a simulated physiological medium such as simulated lung fluid, saline solutions, buffered saline solutions or the like. The solubility of the fibers may be evaluated by measuring the solubility of the fibers in a simulated physiological medium as a function of time. Biosolubility can also be estimated by observing the effects of direct implantation of the fibers in test animals or by the examination of animals or humans that have been exposed to fibers, i.e., biopersistence.

According to various embodiments, the low biopersistence fibers may include the fiberization product of a mixture of oxides of magnesium and silica. These fibers are commonly referred to as magnesium-silicate fibers. The magnesium-silicate fibers generally include the fiberization product of about 60 to about 90 weight percent silica, from greater than 0 to about 35 weight percent magnesia and 5 weight percent or less impurities. According to some embodiments, the inorganic fibers may include the fiberization product of about 60 to about 80 weight percent silica and about 15 to about 30 weight percent magnesia. In some exemplary embodiments, the low biopersistence fibers include the fiberization product of about 65 to about 86 weight percent silica, about 14 to about 35 weight percent magnesia and 5 weight percent or less impurities. According to other embodiments, the low biopersistence fibers include the fiberization product of about 70 to about 86 weight percent silica, about 14 to about 30 weight percent magnesia, and 5 weight percent or less impurities.

A suitable magnesium-silicate fiber is commercially available from Unifrax I LLC (Tonawanda, N.Y., USA) under the registered trademark ISOFRAX®. Commercially available ISOFRAX® fibers generally include the fiberization product of about 70 to about 80 weight percent silica, about 18 to about 27 weight percent magnesia, and 4 weight percent or less impurities (e.g., alumina, calcium oxide, and ferric oxide).

In various embodiments, the low biopersistence fibers consisting of about 50 percent fiber and 50 percent unfiberized particulate are ball milled to reduce both fiber length and unfiberized particulate dimensions.

In some embodiments, the low biopersistence fibers are washed and ball milled. In these embodiments, the low biopersistence fibers are washed to remove the unfiberized particulate material and then further milled to reduce fiber length.

In certain embodiments, the low biopersistence fibers include the fiberization product of a mixture of oxides of calcium, magnesium and silica. These fibers are commonly referred to as calcia-magnesia-silica fibers. According to various embodiments, the calcia-magnesia-silica fibers include the fiberization product of about 45 to about 90 weight percent silica, from greater than 0 to about 45 weight percent calcia, from greater than 0 to about 35 weight percent magnesia, and 10 weight percent or less impurities. The inorganic fibers may include the fiberization product of about 60 to about 70 weight percent silica, about 25 to about 35 percent calcia, about 2 to about 7 weight percent magnesia, and less than 1 weight percent alumina.

Useful calcia-magnesia-silica fibers are commercially available from Unifrax I LLC (Tonawanda, N.Y., USA) under the registered trademark INSULFRAX®. INSULFRAX® fibers generally include the fiberization product of about 61 to about 67 weight percent silica, from about 27 to about 33 weight percent calcia, and from about 2 to about 7 weight percent magnesia. Other suitable calcia-magnesia-silicate fibers are commercially available from Thermal Ceramics (Augusta, Ga.) under the trade designations SUPERWOOL 607 and SUPERWOOL HT. SUPERWOOL 607 fibers include about 60 to about 70 weight percent silica, from about 25 to about 35 weight percent calcia, and from about 4 to about 7 weight percent magnesia, and trace amounts of alumina. SUPERWOOL HT fiber includes about 74 weight percent silica, about 24 weight percent calcia and trace amounts of magnesia, alumina and iron oxide.

Another example of suitable inorganic fibers are leached glass fibers available from BelChem Fiber Materials GmbH, Germany, under the trademark BELCOTEX®, from Hitco Carbon Composites, Inc. of Gardena Calif., under the registered trademark REFRASIL®, and from Polotsk-Steklovolokno, Republic of Belarus, under the designation PS-23(R).

The BELCOTEX® fibers are standard type, staple fiber pre-yarns. These fibers have an average fineness of about 550 tex and are generally made from sodium aluminosilicate glass which is leached to extract the non-silica components. The BELCOTEX® fibers are amorphous and generally contain about 94.5 silica, about 4.5 percent alumina, less than 0.5 percent sodium oxide, and less than 0.5 percent of other components. These fibers are heat resistant to temperatures of up to 1100° C. and are typically shot free and binder free.

The REFRASIL® fibers, like the BELCOTEX® fibers, are amorphous leached glass fibers high in silica content for providing thermal insulation for applications in the 1000° C. to 1100° C. temperature range. The fibers, after leaching, typically have a silica content of about 95 weight percent. Alumina may be present in an amount of about 4 weight percent with other components being present in an amount of 1 percent or less.

The PS-23 (R) fibers from Polotsk-Steklovolokno are amorphous glass fibers high in silica content and are suitable for thermal insulation for applications requiring resistance to at least about 1000° C. These fibers have a fiber length in the range of about 5 to about 20 mm and a fiber diameter of about 9 microns.

Yet another example of a suitable inorganic fiber is E-glass fiber. The E-glass fiber typically includes from about 52 weight percent to about 56 weight percent $SiO_2$, from about 16 weight percent to about 25 weight percent CaO, from about 12 weight percent to about 16 weight percent $Al_2O_3$, from about 5 weight percent to about 10 weight percent $B_2O_3$, up to about 5 weight percent MgO, up to about 2 weight percent of sodium oxide and potassium oxide and trace amounts of iron oxide and fluorides, with a typical composition of 55 weight percent $SiO_2$, 15 weight percent $Al_2O_3$, 7 weight percent $B_2O_3$, 3 weight percent MgO, 19 weight percent CaO and traces of the above mentioned materials.

Inorganic Mineral Particles/Platelets

In various embodiments, the fire protective composition includes inorganic mineral particles or platelets. The inorganic particles or platelets may include inorganic mineral platelets selected from vermiculite, mica, clay, talc platelets and combinations thereof.

Without limitation, the inorganic mineral platelets may have diameters of from about 20 µm to about 500 µm, from about 20 µm to about 400 µm, from about 20 µm to about 300 µm, or from about 40 µm to about 200 µm. Without limitation, the inorganic mineral platelets may have an aspect ratio of from about 50:1 to about 2000:1, from about 50:1 to about 1000:1, from about 100:1 to about 1000:1, or from about 200:1 to about 800:1.

The inorganic mineral platelets typically include inorganic platelets in an amount of from about 20 to about 100 weight percent. According to certain embodiments, the fire protective composition may include inorganic mineral platelets in an amount of at least 20 weight percent, of at least 30 weight percent, of at least 40 weight percent, of at least 50 weight percent, of at least 60 weight percent, of at least 70 weight percent, of at least 80 weight percent, of at least 85 weight percent, of at least 90 weight percent, of at least 95 weight percent, or of at least 99 weight percent, based on the total weight of the fire protective composition.

According to some embodiments, the inorganic mineral platelets include vermiculite platelets or mica platelets. In various embodiments, the fire protective composition includes vermiculite platelets or mica platelets in an amount of from about 20 to about 100 weight percent. The fire protective composition may include vermiculite platelets or mica platelets in an amount of at least 20 weight percent, of at least 30 weight percent, of at least 40 weight percent, of at least 50 weight percent, of at least 60 weight percent, of at least 70 weight percent, of at least 80 weight percent, of at least 85 weight percent, of at least 90 weight percent, of at least 95 weight percent, or of at least 99 weight percent.

In some embodiments, a platelet-containing fire protective composition includes a combination of an inorganic binder and an organic binder. The organic binder may be provided as a solid, a liquid, a solution, a dispersion, an emulsion, or similar form. Examples of suitable organic binders that may be included in the fire protective composition include, but are not limited to, acrylic latex, (meth) acrylic latex, phenolic resins, copolymers of styrene and butadiene, vinylpyridine, acrylonitrile, copolymers of acrylonitrile and styrene, vinyl chloride, polyurethane, copolymers of vinyl acetate and ethylene, phenolics, polyamides, silicones, organic silicones, organofunctional silanes, unsaturated polyesters, epoxy resins, polyvinyl esters (such as polyvinylacetate or polyvinylbutyrate latexes) and the like.

The platelet-containing fire protective composition may include from about 20 to less than about 100 weight percent of inorganic platelets and from greater than 0 to about 80 weight percent of binder, from about 30 to less than about 100 weight percent of inorganic platelets and from greater than 0 to about 70 weight percent of binder, from about 40 to less than about 100 weight percent of inorganic platelets and from greater than 0 to about 60 weight percent of binder, from about 50 to less than about 100 weight percent of inorganic platelets and from greater than 0 to about 50 weight percent of binder, from about 60 to less than about 100 weight percent of inorganic platelets and from greater than 0 to about 40 weight percent of binder, and from about 70 to less than about 100 weight percent of inorganic platelets and from greater 0 to about 30 weight percent of binder.

The platelet-containing fire protective composition may include from about 20 to less than about 100 weight percent of inorganic platelets, from greater than 0 to about 40 weight percent of binder, and from greater than 0 to about 50 weight percent of a functional filler, from about 50 to less than about 100 weight percent of inorganic platelets, from greater than 0 to about 30 weight percent of binder, and from greater than 0 to about 20 weight percent of a functional filler, from about 60 to less than about 100 weight percent of said inorganic platelets, from greater than 0 to about 20 weight percent of a binder, and from greater than 0 to about 20 weight percent of a functional filler. According to various embodiments, the functional filler includes heat resistant insulating inorganic fibers, endothermic materials, flame retardants and combinations thereof.

Without limitation, and only by way of illustration, inorganic mineral platelet compositions suitable as a platelet-containing fire protective composition are commercially available under the trademark MICROLITE™ from Dicalite Management Group/Specialty Vermiculite Corporation (Bala Cynward, Pa., USA). The MICROLITE™ inorganic mineral platelet compositions are supplied as unformulated compositions containing only vermiculite platelets and water, and formulated compositions further include functional additives. The unformulated vermiculite compositions are available under MICROLITE™ 903, 923, 963 and HTS. The formulated vermiculite compositions are available under MICROLITE™ HTS-SE, HTS-XE and HTS-XE 20.

Other Components

Water is included as the vehicle or solvent for the fire protective composition. In various embodiments, water is present in the fire protective composition in an amount of about 30 weight percent to about 35 weight percent of the fire protective composition. A portion of this water is added directly to the formulation as water and portions are included as part of the colloidal silica and chelating agent additions.

A thickening agent may be added to the fire protective composition. The addition of the thickening agent to the fire protective composition prevents the inorganic fibers from settling and hardening prematurely. The addition of the thickening agent also affects the viscosity of the fire protective composition so that by controlling the amount of water and thickening agent in the mixture, the mixture may have a viscosity suitable for trowelling, spraying, dipping, molding, gunning and/or brushing applications. Without limitation, suitable thickening agents include any suitable clay (e.g., bentonite, hectorite, kaolinite, montmorillonite, palygorskite, saponite, smectite, or sepiolite). In several embodiments, the particle structure of the clay consists of agglomerates of highly milled, sub-micron sized primary clay particles. The agglomerates may be up to tens or hundreds of microns in diameter, and the primary particles may be 0.1 micron and smaller. In various embodiments, the clay is present in the fire protective composition in an amount of greater than about 0 weight percent to about 10 weight percent of the fire protective composition. In some embodiments, smectite clay is used as the thickening agent. An exemplary smectite clay is VEEGUM® T, a product commercially available from Vanderbilt Minerals, that consists of about 1 nm×150 nm×150 nm plates that hydrate when added to water.

A chelating or sequestration agent may also be added to the fire protective composition. Suitable chelating agents include diammonium ethylenediamine tetraacetic acid (EDTA), sodium phytate/phytic acid, citric acid/sodium citrate, sodium gluconate, nitrilotriacetic acid, disodium EDTA, disodium ethylenediamine disuccinate, cyclodextrin or diethylenetriaminepentaacetic acid. In various embodiments, the chelating agent is present in the fire protective composition in an amount of greater than about 0 weight percent to about 10 weight percent (as a chelating agent solution) in the wet product or greater than about 0 weight percent to about 6.75 weight percent (as a dry chelating agent) in the dry product. A suitable chelating agent is VERSENE™ EDTA-based chelating agent, a product commercially available from Dow Chemical, which consists of a 45 weight percent solution of diammonium EDTA.

Exemplary Fire Protective Coating Compositions

According to several exemplary embodiments, the fire protective composition is in the form of a fire protective coating composition. In some embodiments, the fire protective coating composition has a resistance to an operating temperature of at least 700° C., at least 800° C., at least 850° C., at least 900° C., at least 950° C., at least 1000° C., at least 1050° C., at least 1100° C., at least 1150° C., at least 1200° C., at least 1250° C., at least 1300° C., at least 1350° C., at least 1400° C., at least 1450° C., at least 1500° C., at least 1500° C., or at least 1600° C.

In various embodiments, the fire protective coating composition includes an inorganic binder, a thickening agent, optionally a chelating or sequestration agent solution, a low biopersistence fiber, and water. In certain embodiments, the chelating agent solution is present, while in other embodiments, the chelating agent solution is not present. The inorganic binder may include colloidal silica solution, the thickening agent may include smectite clay, the chelating agent may include diammonium EDTA, and the low biopersistence fiber may include a magnesia-silica fiber or a calcia-magnesia-silica fiber. In some embodiments, the colloidal silica solution is present in an amount of about 30 weight percent to about 40 weight percent of the fire protective composition, the smectite clay is present in an amount of about 0.5 weight percent to about 6 weight percent of the fire protective composition, the diammonium EDTA solution is present in an amount of about greater than about 0 weight percent to about 10 weight percent of the fire protective composition, the magnesia-silica fiber or the calcia-magnesia-silica fiber is present in an amount of about 50 weight percent to about 55 weight percent of the fire protective composition, and the water is present in an amount of about 10 weight percent to about 30 weight percent of the fire protective composition, excluding water present in the colloidal silica solution and chelating agent solution additives. If water from all components is considered, it is generally present in an amount of about 10 weight percent to about 70 weight percent of the fire protective composition, for example 20 weight percent to about 40 weight percent of the fire protective composition. In certain embodiments, colloidal silica solids are present in an amount of about 5 weight percent to about 40 weight percent of the fire protective composition, the smectite clay is present in an amount of about 0.5 weight percent to about 6 weight percent of the fire protective composition, the magnesia-silica fiber or the calcia-magnesia-silica fiber is present in an amount of about 30 weight percent to about 80 weight percent of the fire protective composition, the diammonium EDTA is present in an amount of about greater than 0 weight percent to about 7 weight percent of the fire protective composition, and water is present in an amount of about 10 weight percent to about 70 weight percent of the fire protective composition.

In several embodiments, the different components of the fire protective composition are packaged as a kit, including instructions regarding how to mix the different components to form the fire protective composition, e.g., which components to mix and for how long. In some embodiments, the kit includes (1) a colloidal silica solution, (2) a clay, (3) a low biopersistence fiber, and (4) instructions regarding how to mix components (1)-(3). In various embodiments, the kit further includes (5) a chelating agent solution.

In other embodiments, the fire protective coating composition includes an inorganic binder, a thickening agent, a RCF, and water. The inorganic binder may include colloidal silica solution, the thickening agent may include smectite clay, and the RCF may include an alumina-silica fiber. In some embodiments, the colloidal silica solution is present in an amount of about 30 weight percent to about 40 weight percent of the fire protective composition, the smectite clay is present in an amount of about 0.5 weight percent to about 6 weight percent of the fire protective composition, the alumina-silica fiber is present in an amount of about 50 weight percent to about 55 weight percent of the fire protective composition, and the water is present in an amount of about 10 weight percent to about 30 weight percent of the fire protective composition, excluding water present in the colloidal silica solution additive. If water from all components is considered, it is present in an amount of about 20 weight percent to about 40 weight percent of the fire protective composition.

In several embodiments, the fire protective composition includes an organic binder, a clay, inorganic mineral platelets, and water. In some embodiments, the organic binder is present in an amount of about 5 weight percent to about 30 weight percent of the fire protective composition, the clay is present in an amount of about 0.1 weight percent to about 6 weight percent of the fire protective composition, the inorganic mineral platelets are present in an amount of about 2 weight percent to about 30 weight percent of the fire protective composition, and water is present in an amount of about 10 weight percent to about 90 weight percent of the fire protective composition. In exemplary embodiments, the organic binder includes a silicone elastomer and an acrylic co-polymer, the clay includes smectite clay, and the inorganic mineral platelets include mica platelets.

Fire-Resistant Building Components and Systems

According to various embodiments, fire-resistant building materials include a building component, material or structure such as a polymeric base and at least one fire protective composition described above. According to certain embodiments, the building component, material or structure includes a polymeric insulation board as the base and a fire protective composition applied on the base. According to other embodiments, the building component, material or structure includes an architectural insulation panel as the base and a fire protective composition applied on the base.

The polymeric insulation board (whether or not part of an architectural insulation panel) may be any polymeric insulation known and used in the building and construction industry to provide insulation to buildings. For example, the polymeric insulation board may be any foam insulation board or panel used in the building and construction industry to provide insulation to building structures, such as walls, roofs, floors, and/or foundations. According to certain embodiments, the polymeric insulation board is manufactured from a polymer foam selected from polystyrene, polyurethane, polyisocyanurate, phenolic, polyurea, low density polyethylene, high density polyethylene, polyvinylchloride, polypropylene, polytetrafluoroethylene, polyamide, polyimide, polyamideimide, polyester, polyetherketone, polyetheretherketone, polyetherketoneketone, polyvinylfluoride, polyaryl sulfone, polyester amide, polyester imide, polyethersulfone, polyphenylene sulfide, ethylene chlorotrifluoroethylene, polyethylene terephthalate, and acrylic polymers, and combinations thereof. According to some embodiments, the polymeric insulation board includes extruded polystyrene. In one embodiment, the polymeric insulation board includes expanded polystyrene. In some embodiments, the polymer foam is selected to have a low density (e.g., less than about 3 pounds per cubic foot).

In several embodiments, a fire-resistant building material includes a first fire protective coating composition and a second fire protective coating composition. The first fire protective coating composition may include inorganic fibers, and the second fire protective coating composition may include mineral platelets. According to certain embodiments and without limitation, the second coating may be at least partially on the first coating, and the first coating may be on the polymeric insulation board.

In some embodiments, the first fire protective coating composition includes high temperature resistant inorganic fibers and a cementitious inorganic binder, and the second fire protective coating composition includes high temperature resistant inorganic mineral particles and/or inorganic mineral platelets and an inorganic binder. In various embodiments, the first coating includes high temperature resistant inorganic mineral particles and/or inorganic mineral platelets and an inorganic binder and the second coating includes high temperature resistant inorganic fibers and a cementitious inorganic binder.

According to certain embodiments, and without limitation, the insulation board may be in the shape of a substantially rectangular cuboid, with two major faces, a first and second short edge, and two long side edges. There is really no practical limitation on the shape of the polymeric insulation board. The first coating composition may partially, substantially, or entirely surround or encapsulate the polymeric insulation board. Likewise, the second coating composition may partially, substantially, or entirely surround or encapsulate the first coating composition on the polymeric insulation board.

The terms "entirely surround or encapsulate" or "fully surround or encapsulate" have the same meaning herein and refer to a fire protective coating composition that coats or otherwise covers 100% of the exposed surface area of the opposite facing major surfaces and the edge surfaces of the polymeric insulation board. The term "partially surround or encapsulate" means that the fire protective composition coats or otherwise covers greater than 0 to 50% (which range includes greater than 0 to 45%, greater than 0 to 40%, greater than 0 to 35%, greater than 0 to 30%, greater than 0 to 25%, greater than 0 to 20%, greater than 0 to 15%, greater than 0 to 10%, greater than 0 to 5%, and all ranges encompassed within the broad range of greater than 0 to 50%) of the exposed surface area of the opposite facing major surfaces and the edge surfaces of the polymeric insulation board. The term "substantially surround or encapsulate" means that the fire protective composition coats or otherwise covers greater than 50% to less than 100% (which range includes greater than 50% to 55%, greater than 50% to 60%, greater than 50% to 65%, greater than 50% to 70%, greater than 50% to 75%, greater than 50% to 80%, greater than 50% to 85%, greater than 50% to 90%, greater than 50% to 95%, and all ranges encompassed within the broad range of greater than 50% to less than 100%) of the exposed surface area of the opposite facing major surfaces and the edge surfaces of the polymeric insulation board.

According to certain embodiments, the first fire protective coating composition may entirely surround or encapsulate the polymeric insulation board to form a continuous first coating layer on the exterior surfaces of the polymeric insulation board (i.e., the first coating composition forms a continuous coating layer that is in direct adjacent contact with the exterior surfaces, including the major face surfaces and edge surfaces of the polymeric insulation board), and the second fire protective coating composition may entirely surround or encapsulate the first coating layer on the polymeric insulation board to form a continuous second coating layer on the first fire protective coating layer that is on exterior surfaces of the polymeric insulation board (i.e., the second coating composition forms a continuous coating layer that is in direct adjacent contact with the first coating layer). In other embodiments, the second fire protective coating composition may partially or substantially surround or encapsulate the first coating layer on the polymeric insulation board to form a discontinuous second coating layer on the first coating layer that is on exterior surfaces of the polymeric insulation board (i.e., the second coating composition forms a discontinuous coating layer that is in direct adjacent contact with the first coating layer).

In some embodiments, the first fire protective coating composition may substantially or partially surround or encapsulate the polymeric insulation board to form a discontinuous first coating layer on the exterior surfaces of the polymeric insulation board (i.e., the first fire protective coating composition forms a discontinuous coating layer that is in direct adjacent contact with the exterior surfaces of the polymeric insulation board), and the second fire protective coating composition may entirely surround or encapsulate the first coating layer on the polymeric insulation board to form a continuous second coating layer on the first coating layer that is on exterior surfaces of the polymeric insulation board (i.e., the second fire protective coating composition forms a continuous coating layer that is in direct adjacent contact with the first coating layer).

The resulting fire-resistant insulation board may be used in a building wall application. There is no limitation as to the application of the fire-resistant polymeric insulation board. The fire-resistant polymeric insulation board may be used in a wide variety of commercial, industrial and residential building structures.

A building product that includes an insulation layer positioned between outer metal or metal alloy layers is also provided. This type of building product is referred to in the building and construction industry as an architectural panel, an architectural insulation panel, an insulated metal panel, or a metal insulated panel. The architectural panel may include one or more layer(s) of insulation positioned between two outer metal or metal alloy layers. For example, and without limitation, the architectural panel may include a layer of polymer foam insulation positioned between two outer metal or metal alloy layers. According to some embodiments, the architectural panel includes an inner layer of polymeric foam insulation positioned between two outer metal layers. According to several embodiments, the architectural panel includes an inner layer of polymeric foam insulation positioned between two outer aluminum metal layers. This creates a structure in which the layer of polymeric foam insulation is sandwiched between the two outer aluminum metal layers.

According to various embodiments, a fire protective composition is coupled with a polymeric foam insulation board. According to certain embodiments, the polymeric foam insulation layer of the architectural panel includes a polymeric foam insulation board. The polymeric foam insulation board has opposite facing first and second major surfaces. A first outer aluminum metal layer is positioned on the side of the first major surface of the polymeric foam insulation board. A second outer aluminum metal layer is positioned on the side of the second major surface of the polymeric foam insulation board. According to certain embodiments, one or more layers of the fire protective composition is positioned on one or both sides of the major surfaces of the polymeric foam insulation board.

According to various embodiments, the fire protective composition is positioned on one side of the polymeric foam insulation board. An architectural insulation panel may include an inner combustible polymeric insulation layer positioned between first and second outer metal layers. At least one layer of a fire protective composition is positioned on (i) the outwardly facing surface of the first metal layer, (ii) the outwardly facing surface of the second metal layer, (iii) between the inwardly facing surface of the first metal layer and the polymeric insulation layer, (iv) between the inwardly facing surface of the second metal layer and the polymeric insulation layer, and (v) combinations of any of (i)-(iv). It should be noted that there may also be other layers interposed between the first metal layer, the polymeric insulation layer and the second metal layer such that the term "on" is not limited to direct contact with a surface.

In certain embodiments, the architectural panel includes the following layers, in order, (i) a first outer aluminum metal layer, (ii) the fire protective composition layer, (iii) a polymeric foam insulation board, and (iv) a second outer aluminum metal layer. The fire protective composition may include high temperature inorganic fibers and a cementitious inorganic binder, or high temperature resistant inorganic mineral particles and/or platelets and a binder, or both inorganic fibers and inorganic mineral particles or platelets, and a binder.

In some embodiments, the architectural panel includes the following layers, in order, (i) a first outer aluminum metal layer, (ii) a polymeric foam insulation board, (iii) a fire protective composition layer including high temperature resistant inorganic fibers and cementitious inorganic binder, and (iv) a second outer aluminum metal layer. In several embodiments, the architectural panel includes the following layers, in order, (i) a first outer aluminum metal layer, (ii) a fire protective composition layer including high temperature resistant inorganic mineral particles and/or platelets and binder, (iii) a polymeric foam insulation board, and (iv) a second outer aluminum metal layer. In other embodiments, the architectural panel includes the following layers, in order, (i) a first outer aluminum metal layer, (ii) a fire protective composition layer including high temperature resistant inorganic fibers and a cementitious binder, (iii) a fire protective composition layer including high temperature resistant inorganic mineral particles and/or platelets, (iv) a polymeric foam insulation board, and (v) a second outer aluminum metal layer. In several embodiments, the architectural panel includes the following layers, in order, (i) a first outer aluminum metal layer, (ii) a fire protective composition layer including high temperature resistant inorganic mineral particles and/or platelets, (iii) a fire protective composition layer including high temperature resistant inorganic fibers and cementitious binder, (iv) a polymeric foam insulation board, and (v) a second outer aluminum metal layer.

According to certain embodiments, the fire protective composition is positioned on both sides of the polymeric foam insulation board. According to these embodiments, the architectural panel includes the following layers, in order, (i) a first outer aluminum metal layer, (ii) a first fire protective composition layer, (iii) a polymeric foam insulation board, (iv) a second fire protective composition layer, (iii) a polymeric foam insulation board, and (v) a second outer aluminum metal layer.

According to several embodiments, the architectural panel includes the following layers, in order, (i) a first outer aluminum metal layer, (ii) a first fire protective composition including (a) inorganic fibers and binder, (b) inorganic mineral particles and/or platelets, or (c) both, (iii) a polymeric foam insulation board, (iv) a second fire protective composition layer including (a) inorganic fibers and binder, (b) inorganic mineral particles and/or platelets, or (c) both, and (v) a second outer aluminum metal layer. In certain embodiments, the architectural panel includes the following layers, in order, (i) a first outer aluminum metal layer, (ii) a first fire protective composition layer including high temperature resistant inorganic fibers and binder, (iii) a fire protective composition layer including high temperature resistant inorganic mineral particles and/or platelets, (iv) a polymeric foam insulation board, (v) a fire protective composition layer including high temperature resistant inorganic mineral particles and/or platelets, (vi) a fire protective composition layer including high temperature resistant inorganic fibers and binder, and (vii) a second outer aluminum metal layer. In various embodiments, the architectural panel includes the following layers, in order, (i) a first outer aluminum metal layer, (ii) a fire protective composition layer comprising high temperature resistant inorganic mineral particles and/or platelets, (iii) a fire protective composition layer comprising high temperature resistant inorganic fibers and binder, (iv) a polymeric foam insulation board, (v) a fire protective composition layer comprising high temperature resistant inorganic mineral particles and/or platelets, (vi) a fire protective composition layer comprising high temperature resistant inorganic fibers and binder, and (vii) a second outer aluminum metal layer. In various embodiments, the architectural panel includes the following layers, in order, (i) a first outer aluminum metal layer, (ii) a fire protective composition layer including high temperature resistant inorganic mineral particles and/or platelets, (iii) a fire protective composition layer including high temperature resistant inorganic fibers and binder, (iv) a polymeric foam insulation board, (v) a fire protective composition layer including high temperature resistant inorganic fibers and binder, (vi) a fire protective composition layer including high temperature resistant inorganic mineral particles and/or platelets, and (vii) a second outer aluminum metal layer.

The fire protective layer (i.e., fire protective coatings, papers, felts, fabrics, mats, compositions, treatments, etc.) may also be applied to the outer major surfaces and edge surfaces of the metal or metal layers of the architectural panels. According to certain embodiments, the architectural panel includes a first outer metal or metal alloy layer, a second outer metal or metal alloy layer, and at least one layer of insulation positioned between the first and second metal or metal alloy layers, wherein a fire protective treatment is on the outer major surface (i.e., the outwardly facing major surface) of the first outer metal or metal layer, or on the outer major surface of the second outer metal or metal alloy layer, or on the major surfaces of both the first and second outer metal or metal alloy layers. The fire protective treatment may also be applied to the edge surfaces of one or both of the first and second outer metal or metal alloy layers.

According to certain embodiments, one or more fire protective layer(s) are on one or both of the outwardly facing major surfaces of the first and second outer metal or metal alloy layers of the architectural panel, and also positioned between the inwardly facing major surfaces of the one or more of the first and second outer metal or metal alloy layers and the inner insulation layer positioned between the two outer metal or metal alloy layers. The fire protective treatment may also be applied to the edge surfaces of one or both of the first and second outer metal or metal alloy layers.

The fire protective composition may be combined with the polymeric insulation board or architectural insulation panel as a coating, fabric (non-woven or woven), felt, paper, industrial textile and the like. According to certain embodiments, the fire protective composition is provided as a fire protective coating composition that is applied to a polymeric insulation board or architectural insulation panel. There is no limitation as to the method or process of applying a first coating to the polymeric insulation board, or applying a second coating to the polymeric insulation board that is coated with the first coating. According to certain illustrative embodiments, the first coating may be applied to the polymeric board by application with a brush, roller, trowel, or other applicator, spraying, casting, immersing or submerging the polymeric board into a vessel containing the first coating, or combinations thereof. Likewise, the second coating may be applied to the first coating with a brush, roller, trowel, or other applicator, spraying, casting, immersing or submerging the polymeric board coated with the dried first coating into a vessel containing the second coating, or combinations thereof.

In certain embodiments, a foil facing is attached to the polymeric insulation board before the fire protective composition is applied. For example, the foil facing is adhered to or otherwise attached to the polymeric insulation board, and then the fire protective composition is applied onto the foil facing. In certain embodiments, the foil facing is disposed around the insulation board partially or totally encapsulating the insulation board, to impart added strength, abrasion and tear resistance, and resistance to cracking for certain applications. In certain embodiments, the foil facing wraps or partially or substantially totally envelops the insulation board. The foil facing is typically made of aluminum, although other malleable metals, such as copper, zinc, steel or tin are also suitable. The average thickness of the foil facing may vary. The average thickness of the foil facing may range from 10 to 500 microns In certain embodiments, a glass fiber cloth facing is attached to the polymeric insulation board before the fire protective composition is applied. For example, the glass fiber cloth facing is adhered to or otherwise attached to the polymeric insulation board, and then the fire protective composition is applied onto the glass fiber cloth facing. In certain embodiments, the glass fiber cloth facing is disposed around the insulation board partially or totally encapsulating the insulation board, to impart added strength, abrasion and tear resistance, and resistance to cracking for certain applications. In certain embodiments, the glass fiber cloth facing wraps or partially or substantially totally envelops the insulation board. The glass fiber cloth facing is typically made of E-glass or other high-temperature tolerant continuous glass fiber. The average thickness of the glass fiber cloth facing may vary. The average thickness of the glass fiber cloth facing may range from 25 to 1000 microns Alternatively, the fire protective composition may take the form of felt, paper, non-woven fabric, or woven fabric. According to certain embodiments, a first fire protective composition includes a fire protective coating composition and a second fire protective composition includes a layer in the form of a felt, paper, non-woven fabric, or woven fabric. In other embodiments, the first fire protective composition includes a layer in the form of a felt, paper, non-woven fabric, or woven fabric, and the second fire protective composition includes a fire protective coating composition.

A building wall including the fire-resistant polymeric insulation board or architectural panel is also described. According to certain embodiments, the building wall includes a vertically extending building wall frame. The building wall frame includes opposite facing surfaces (i.e., a surface of the building frame faces internally and the opposite building frame surface faces toward the external environment). According to certain embodiments, the fire-resistant polymeric insulation board or fire-resistant architectural panel is attached (or otherwise affixed, applied, or secured) to the surface of the building wall frame facing toward the external environment. A layer of an exterior cladding material is applied over the externally facing surface of the fire-resistant polymeric insulation board or fire-resistant architectural panel.

According to several embodiments, the building wall includes a vertically extending building wall frame, a building wall substrate attached to the building wall frame, a fire-resistant architectural panel or fire-resistant polymeric insulation board attached to the building wall substrate and an external cladding material applied over the architectural panel or insulation board. The building wall frame includes opposite facing surfaces to the externally facing surface of the building wall substrate. Finally, a layer of an exterior cladding material is applied over the externally facing surface of the fire-resistant architectural panel or fire-resistant polymeric insulation board. A weather barrier layer may be disposed or otherwise positioned between the externally facing surface of the building wall substrate and the internally facing surface of the fire-resistant architectural panel or fire-resistant polymeric insulation board.

According to yet other embodiments, the building wall includes a vertically extending building wall frame, a building wall substrate attached to opposite faces of the building wall frame, and the fire-resistant architectural panel or fire-resistant polymeric insulation board positioned between the building wall substrates. The building wall frame includes opposite facing surfaces. A first building wall substrate is attached to the externally facing surface of the building wall frame. A second building wall substrate is attached to the internally facing surface of the building wall frame. The fire-resistant architectural panel or fire-resistant polymeric insulation board is positioned in the cavity or space between the first and second building wall substrates. A layer of an exterior cladding material is applied over the externally facing surface of the first building wall substrate. A weather barrier layer may be disposed between the first building wall substrate and the exterior cladding layer.

For all of the embodiments described herein, the fire-resistant architectural panel or fire-resistant polymeric insulation board may be attached to the building wall frame or building wall substrate by mechanical fasteners, adhesives, friction fit, or a combination of these attachment means.

The building wall substrate may be any building wall substrate known and used in the building and construction industry. The building wall substrate may be selected from plywood sheathing, cement board, gypsum board, oriented strand board, particle board, wafer board, fiberboard, poured concrete wall, and concrete masonry unit wall. According to certain embodiments, the building wall substrate may simply include the fire-resistant architectural panel of any of the illustrative embodiments disclosed above attached to the exterior or interior surfaces (or both surfaces) of the vertical building wall frame.

The exterior cladding layer may be selected from brick, concrete block, masonry block, metal siding, vinyl siding, wood siding, stucco finishes, synthetic stucco, and the like. According to several embodiments, the exterior cladding layer may simply include the fire-resistant architectural panel of any of the illustrative embodiments disclosed above attached to the exterior surface(s) of the vertical building wall frame. The outerwardly facing surface of the fire-resistant protected architectural insulation panel may be provided with an aesthetic finish surface or a textured surface.

According to several exemplary embodiments, the fire-resistant architectural panel or fire-resistant insulation board may be used in a building system. The building system may include at least four walls and a roof, wherein at least one of the walls includes a plurality of vertically disposed wall panels with the fire-resistant architectural panel or fire-resistant insulation board attached to the exterior surface of the building wall frame, or attached to the interior surface of the building wall frame, or positioned within the cavity created by the building wall frame. The fire-resistant architectural panel or fire-resistant insulation board may be fixed in the wall with mechanical fasteners, adhesives, or via a friction fit.

The fire-resistant polymeric foam insulation board may also be used in roof and floor constructions. For floor applications, the fire-resistant polymeric foam insulation board may be positioned between a flooring substrate, such as a floor underlayment, and a top floor covering layer. For roof applications, the fire-resistant polymeric foam insulation board may be positioned between a roof substrate and a roof covering layer such as a bituminous roof membrane, a rubber-modified bituminous roof membrane, or a rubber roof membrane. For alternative roof applications, the outwardly facing major surface of the roof substrate may be treated with the one or more layers of the fire protective compositions disclosed herein.

The fire-resistant architectural panel, fire-resistant polymeric foam insulation board, and building wall, roofs, floors, and building structures will now be described in greater detail with reference to the drawing figures. It should be noted that the fire-resistant insulation board, building wall and building structures are not intended to be limited to the illustrative embodiments shown in the drawing figures.

FIG. 1A shows a side view of one embodiment of the fire-resistant polymeric insulation board or panel 10 showing first and second coatings of fire protective compositions. The insulation board 10 is shown in the shape of a substantially rectangular cuboid having opposite facing major faces 13, 14, long edge faces 15 (other long edge face not shown), and short edge faces 16, 17. The fire-resistant insulation board 10 includes a foam polymeric board 12, a first layer 18 including inorganic fibers and a cementitious binder on the insulation board 12 and a second layer 19 including inorganic mineral platelets and a binder on the first layer 18. As shown, and without limitation, the second layer 19 may be applied onto the first layer 18, and the first layer 18 may be applied onto the polymeric foam insulation board 12. As shown, and without limitation, the second layer 19 is in direct adjacent contact with the first layer 18, and the first layer 18 is in direct adjacent contact with the polymeric foam insulation board 12.

Figure 2A:
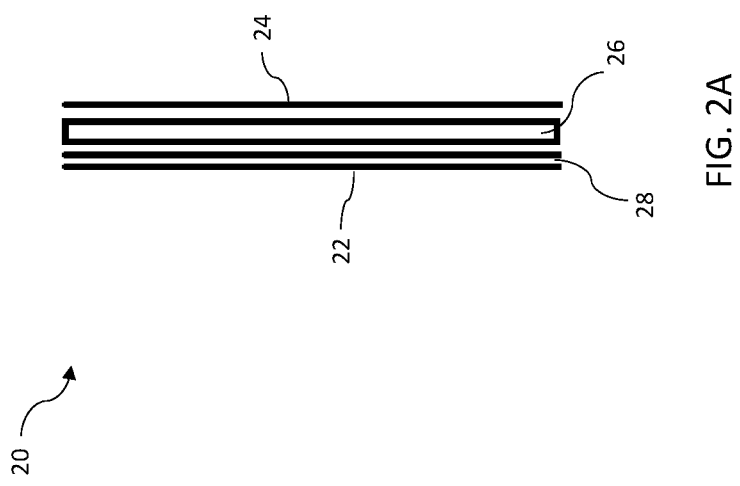
FIG. 2A illustrates a side view of a fire-resistant architectural panel according to embodiments of the present disclosure.

FIG. 2A shows a side view of one illustrative embodiment of a fire-resistant architectural panel 20 for a building structure. The architectural panel 20 includes a first aluminum metal layer 22, a second aluminum metal layer 24, and an insulation layer 26 positioned between the first 22 and second 24 metal layers. The insulation layer 26 shown in FIG. 2A is a polymeric insulation board 26. According to the embodiment shown in FIG. 2A, the architectural panel 20 includes a fire protective layer 28 positioned between the first metal layer 22 and the polymeric foam insulation board 26.

FIG. 2B shows a side view of another illustrative embodiment of the fire-resistant architectural panel 20 for a building structure. The architectural panel 20 includes a first aluminum metal layer 22, a second aluminum metal layer 24, and an insulation layer 26 positioned between the first 22 and second 24 metal layers. The insulation layer 26 shown in FIG. 2B is a polymeric insulation board 26. According to the embodiment shown in FIG. 2B, the architectural panel 20 includes first 28 and second 30 fire protective layers. The first fire protective layer 28 is positioned adjacent the inner major surface of the first metal layer 22. The second fire protective layer 30 is positioned adjacent to the first fire protective layer 28.

FIG. 2C shows a side view of one illustrative embodiment of the fire protected architectural panel 20 for a building structure. The architectural panel 20 includes a first aluminum metal layer 22, a second aluminum metal layer 24, and an insulation layer 26 positioned between the first 22 and second 24 metal layers. The insulation layer 26 shown in FIG. 2C is a polymeric insulation board 26. According to the embodiment shown in FIG. 2C, the architectural panel 20 includes a fire protective layer 28 positioned between the second metal layer 24 and the polymeric foam insulation board 26.

FIG. 2D shows a side view of another illustrative embodiment of the fire protected architectural panel 20 for a building structure. The architectural panel 20 includes a first aluminum metal layer 22, a second aluminum metal layer 24, and an insulation layer 26 positioned between the first 22 and second 24 metal layers. The insulation layer 26 shown in FIG. 2D is a polymeric insulation board 26. According to the embodiment shown in FIG. 2D, the architectural panel 20 includes first 28 and second 30 fire protective layers positioned between the second metal layer 24 and the polymeric foam insulation board 26. The first fire protective layer 28 is positioned adjacent the inner major surface of the second metal layer 24. The second fire protective layer 30 is positioned between the first fire protective layer 28 and the polymeric foam insulation board 26.

Figure 2E:
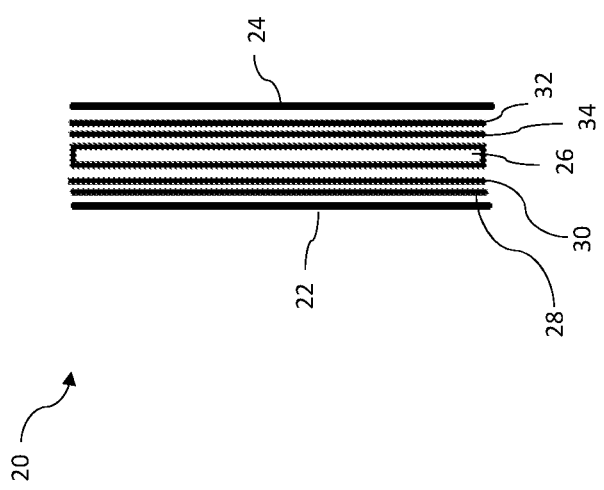
FIG. 2E illustrates a side view of a fire-resistant architectural panel according to embodiments of the present disclosure.

FIG. 2E shows a side view of another illustrative embodiment of the fire protected architectural panel 20 for a building structure. The architectural panel 20 includes a first aluminum metal layer 22, a second aluminum metal layer 24, and an insulation layer 26 positioned between the first 22 and second 24 metal layers. The insulation layer 26 shown in FIG. 2E is a polymeric insulation board 26. According to the embodiment shown in FIG. 2E, the architectural panel 20 includes first 28 and second 30 fire protective layers positioned between the first metal layer 22 and the polymeric foam insulation board 26. The first fire protective layer 28 is positioned adjacent the inner major surface 23 of the first metal layer 22. The second fire protective layer 30 is positioned between the first fire protective layer 28 and the polymeric foam insulation board 26. The architectural panel 20 also includes third 32 and fourth 34 fire protective layers positioned between the second metal layer 24 and the polymeric foam insulation board 26. The third fire protective layer 32 is positioned adjacent the inner major surface of the second metal layer 24. The second fire protective layer 34 is positioned between the first fire protective layer 32 and the polymeric foam insulation board 26.

FIG. 3 shows a side view of an illustrative embodiment of a building structure 31 including at least one building wall 37 insulated by the fire-resistant polymeric insulation board 34 of the present disclosure. Building structure 30 includes a wall frame 33. The fire-resistant polymeric insulation board 34 is affixed to the surface of the building wall frame 33 that faces to the external environment. The fire protected insulation board 34 includes a first fire protective layer 35 on the surface of the board 34 and a second fire protective layer 36 on the first layer 35. A layer of external cladding 38 is applied over the fire protected polymeric foam insulation board 34.

FIG. 4 shows a side view of another illustrative embodiment of a building structure 40 including at least one building wall 42 insulated by the fire-resistant insulation board 46 of the present disclosure. Building structure 40 includes a wall frame 43. A building wall substrate 44 is affixed to the surface of the building wall frame 43 that faces to the external environment. The fire-resistant polymeric insulation board 46 is affixed to the surface of the building wall substrate 44 that faces to the external environment. The fire-resistant insulation board 46 includes a first fire protective layer 47 on the surface of the board 46 and a second fire protective layer 48 on the first layer 47. A layer of external cladding 49 is applied over the fire-resistant polymeric foam insulation board 46.

Figure 5:
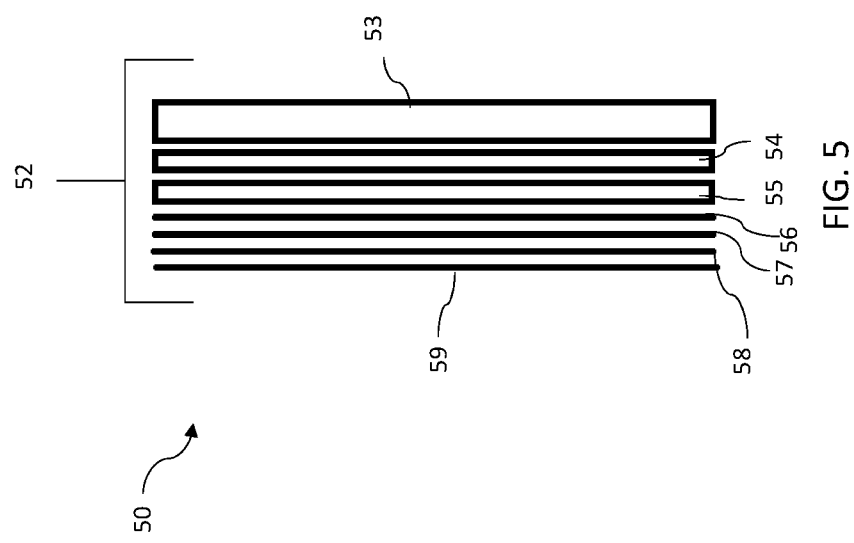
FIG. 5 illustrates a side view of a building wall structure including a fire-resistant polymeric foam insulation board according to embodiments of the present disclosure.

FIG. 5 shows a side view of another illustrative embodiment of a building structure 50 including at least one building wall 52 insulated by the fire-resistant insulation board 55 of the present disclosure. Building structure 50 includes a wall frame 53. A building wall substrate 54 is affixed to the surface of the building wall frame 53 that faces to the external environment. The fire-resistant polymeric insulation board 55 is affixed to the surface of the building wall substrate 54 that faces to the external environment. The fire-resistant insulation board 55 includes a first fire protective layer 56 on the surface of the board 55 and a second fire protective layer 57 on the first layer 56. A layer of external cladding 59 is applied over the coated, fire-resistant insulation board 55. A weather barrier layer 58 is disposed between the externally facing surface of the insulation board 55 and the external cladding 59.

Figure 6:
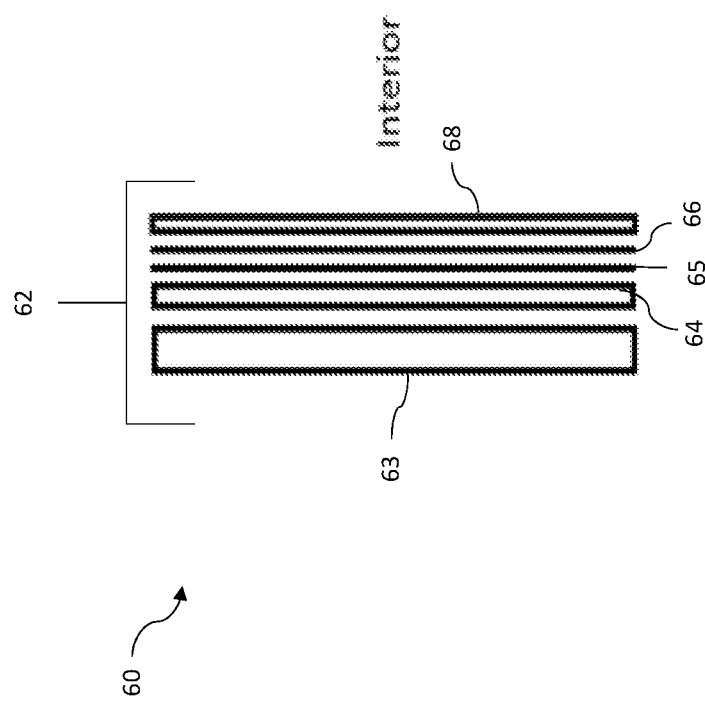
FIG. 6 illustrates a side view of a building wall structure including a fire-resistant polymeric foam insulation board according to embodiments of the present disclosure.

FIG. 6 shows a side view of another illustrative embodiment of a building structure 60 including at least one building wall 62 insulated by the fire-resistant insulation board 64 of the present disclosure. Building structure 60 includes a wall frame 63. The fire-resistant insulation board 64 is affixed to the surface of the building wall frame 63 that faces to the interior of the building structure 60. The fire-resistant insulation board 64 includes a first fire protective layer 65 on the surface of the board 64 and a second fire protective layer 66 on the first layer 65. A layer of interior wall board 68 is applied over the fire-resistant polymeric foam insulation board 64.

Figure 7:
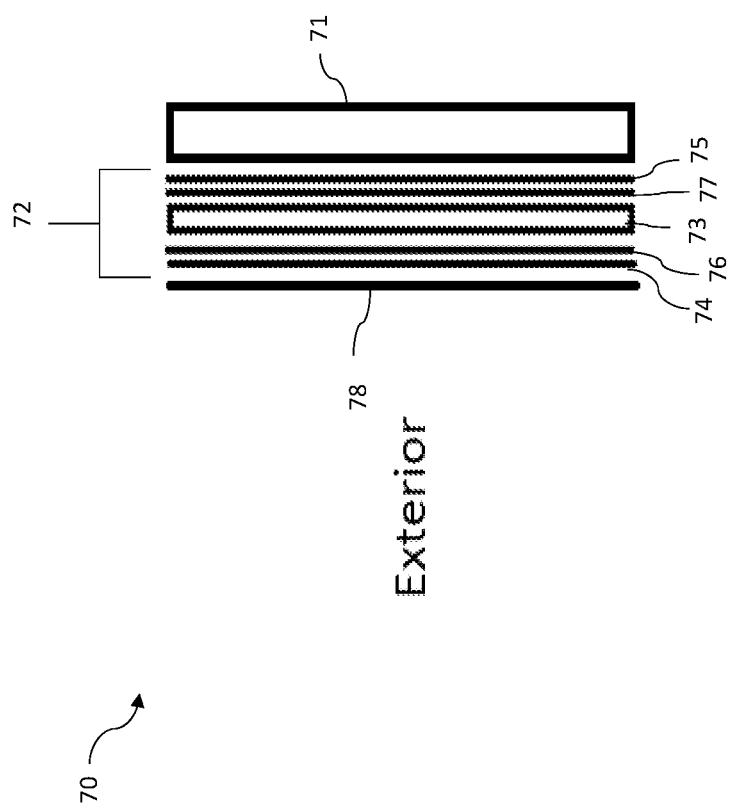
FIG. 7 illustrates a side view of a building wall structure including a fire-resistant architectural insulation panel according to embodiments of the present disclosure.

FIG. 7 shows a side view of an illustrative embodiment of a building wall 70 insulated by the fire-resistant architectural panel 72 of the present disclosure. Building wall 70 includes a wall frame 71. The fire-resistant architectural panel 72 is affixed to the surface of the building wall frame 71 that faces to the external environment. The architectural panel 72 includes insulation layer 73, outer metal layers 74, 75, and first and second fire protective layers 76, 77 between the outer metal layers and the inner insulation board layer 73. A layer of external cladding 78 is applied over the fire-resistant architectural panel 72.

Figure 8:
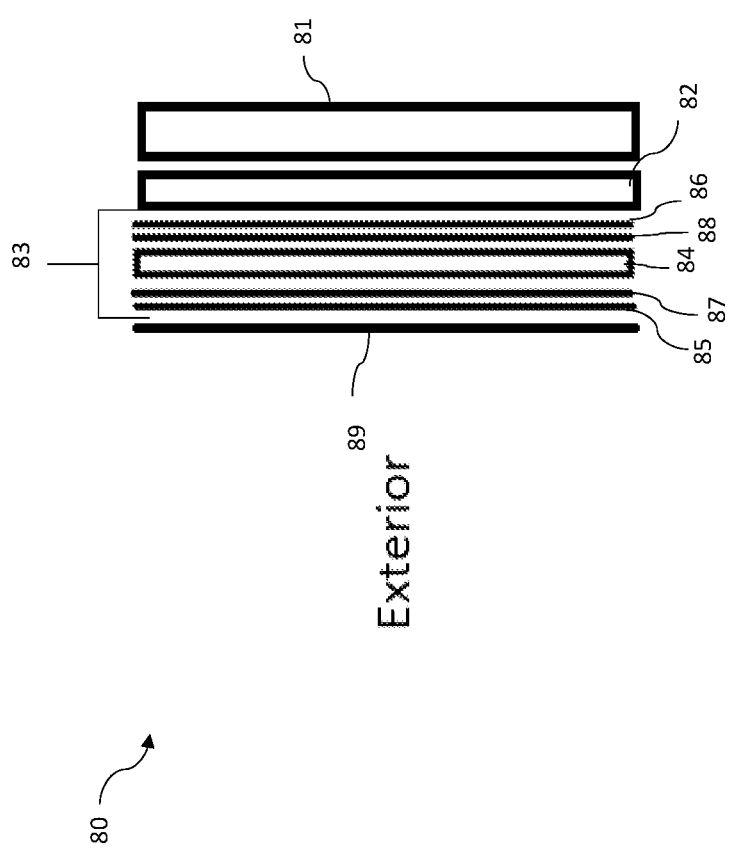
FIG. 8 illustrates a side view of a building wall structure including a fire-resistant architectural insulation panel according to embodiments of the present disclosure.

FIG. 8 shows a side view of another illustrative embodiment of a building wall 80 insulated by the fire-resistant architectural panel 83 of the present disclosure. Building wall 80 includes a wall frame 81. A building wall substrate 82 is affixed to the surface of the building wall frame 81 that faces to the external environment. The fire-resistant architectural panel 83 is affixed to the surface of the building wall substrate 82 that faces to the external environment. The architectural panel 83 includes insulation layer 84, outer metal layers 85, 86, and first and second fire protective layers 87, 88 between the outer metal layers and the inner insulation board layer 84. A layer of external cladding 89 is applied over the fire protected architectural panel 93.

Figure 9:
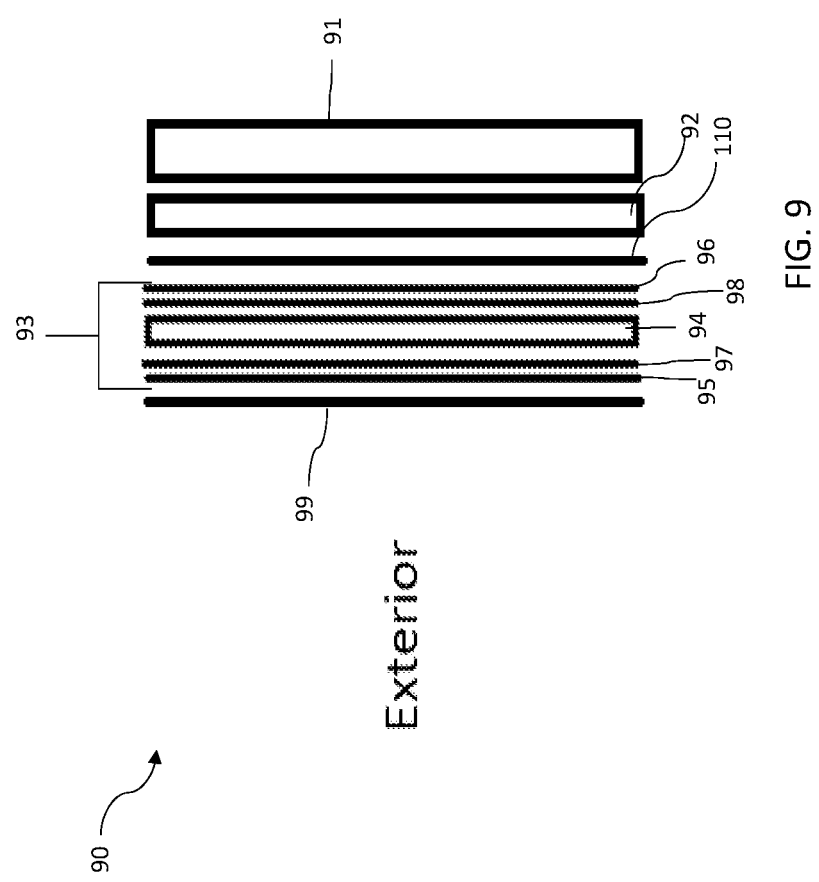
FIG. 9 illustrates a side view of a building wall structure including a fire-resistant architectural insulation panel according to embodiments of the present disclosure.

FIG. 9 shows a side view of another illustrative embodiment of a building wall 90 insulated by the fire-resistant architectural panel 93 of the present disclosure. Building wall 90 includes a wall frame 91. A building wall substrate 92 is affixed to the surface of the building wall frame 91 that faces to the external environment. The fire-resistant architectural panel 93 is affixed to the surface of the building wall substrate 92 that faces to the external environment. The architectural panel 93 includes insulation layer 94, outer metal layers 95, 96, and first and second fire protective layers 97, 98 between the outer metal layers and the inner insulation board layer 94. A layer of external cladding 99 is applied over the fire-resistant architectural panel 93. A weather barrier layer 110 is disposed between the externally facing surface of the building wall substrate 92 and the internally facing surface of the fire-resistant architectural panel 93.

Figure 10:
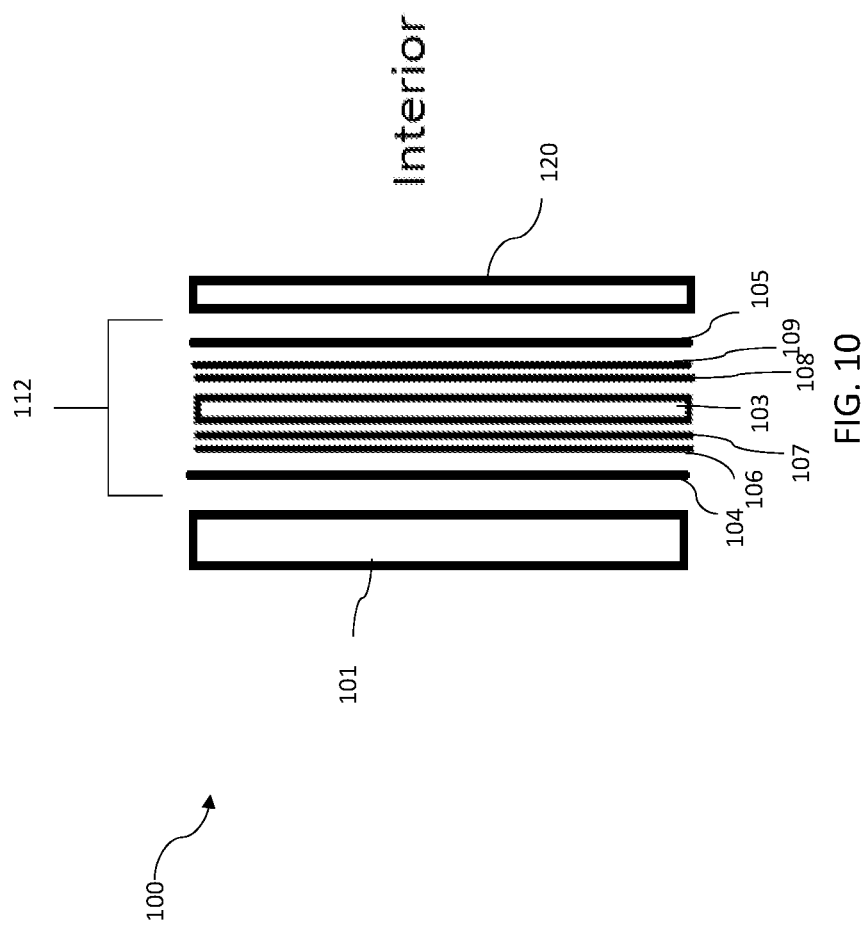
FIG. 10 illustrates a side view of a building wall structure including a fire-resistant architectural insulation panel according to embodiments of the present disclosure.

FIG. 10 shows a side view of another illustrative embodiment of a building wall 100 insulated by the fire-resistant architectural panel 112 of the present disclosure. Building wall 100 includes a wall frame 101. The fire-resistant architectural panel 112 is affixed to the surface of the building wall frame 101 that faces to the interior of the building. The architectural panel 112 includes insulation layer 103, outer metal layers 104, 105, and first and second fire protective layers 106, 107, 108, 109 between the outer metal layers and the inner insulation board layer 103. A layer of interior wall board 120 is applied over the fire-resistant architectural panel 112.

Methods of Preparing Fire-Resistant Building Components

Methods of preparing the fire-resistant polymeric insulation board are also provided. The methods include applying one or more fire protective coating compositions to the polymeric insulation board. According to certain embodiments, the method includes providing first and second coating compositions to the polymeric insulation board. According to several embodiments, a first fire protective coating composition is applied on the polymeric insulation board. The first fire protective coating composition is applied in a manner that partially, substantially or entirely encapsulates or surrounds the exterior surfaces of the polymeric insulation board. The first fire protective coating composition is exposed to a sufficient temperature and for a sufficient period of time in which to substantially or completely dry the first fire protective coating composition. After the first fire protective coating composition is substantially or completely dried, then the second fire protective coating composition is applied on the first fire protective coating composition.

According to certain embodiments, the first fire protective coating composition is permitted to dry at a temperature in the range of from about 15° C. to about 200° C., or from about 20° C. to about 120° C., or from about 20° C. to about 90° C. According to certain embodiments, the first fire protective coating composition is permitted to dry for a period of time of about 1 to about 10 hours, or from about 1 to about 5 hours, or about 1 to about 3 hours. The second fire protective coating composition is applied on the first fire protective coating composition in a manner that partially, substantially or entirely encapsulates or surrounds the first fire protective coating composition. The second fire protective coating composition is then permitted to dry.

An inorganic fiber fire protective coating composition may be applied to a base, another fire protective composition layer, or substrate at a thickness of from about 0.01 to about 3 mm, or from about 0.03 to about 1 mm, or from about 0.05 to about 1 mm. An inorganic mineral platelet or mineral particle fire protective coating composition may be applied on a base, another fire protective composition layer, or substrate at a thickness of from about 0.01 to about 0.8 mm, or from about 0.05 to about 0.2 mm, or from about 0.075 to about 0.2 mm. Both the fiber and the mineral particle/platelet compositions exhibit excellent adhesion to the surfaces of building components, elements, materials, or structures such as foam polymeric insulation boards. Both the fiber and the mineral particle/platelet compositions exhibit excellent adhesion to a dried or substantially dried layer of the other fire protective composition.

The following examples are illustrative of the materials and methods discussed above and are not intended to be limiting.

Example 1

A commercially available expanded polystyrene panel (Foamular® XPS, Owens Corning) was coated with a RCF-based coating composition and allowed to dry overnight at room temperature. The coated insulation board was subsequently coated with two spray coatings of an inorganic mineral layer including vermiculite platelets designated MICROLITE™ HTS from Dicalite Management Group/Specialty Vermiculite and allowed to dry for 24 hours at room temperature. The resulting coated insulation board was exposed to a blowtorch flame at a distance of approximately 1.75 inches. The coated insulation board exhibited a red glow, but did not flame in response to over 2 minutes consistent exposure to the blowtorch flame from the same distance.

An uncoated expanded polystyrene panel was exposed to the same blowtorch from the same distance and for the same period of time for comparison purposes. This comparative expanded polystyrene panel began to show flames after about 6 seconds of exposure to the blowtorch.

Example 2

A 2'×2'×1" commercially available expanded polystyrene (XPS) panel (Foamular® XPS, Owens Corning) was coated on both 2'×2' faces with a dual coating fire protective coating system. The first coating of the dual coating fire protective coating system was an RCF-based coating composition and the second coating of the dual coating fire protective system was an inorganic mineral layer including vermiculite platelets designated MICROLITE™ HTS from Dicalite Management Group/Specialty Vermiculite and allowed to dry for 24 hours at room temperature. The RCF coating composition was coated onto the surface of the XPS panel at about 450 gsm and the vermiculite coating was applied to the first coating at about 150 gsm. The XPS panel coated with the dual coating fire protective system was mounted vertically (i.e., with the primary face of the XPS panel facing vertical) for the fire testing. A 3" diameter propane burner was used in the fire tests to generate the flame. The flow of propane to the burner was adjusted with a flow controller device to give the target temperature approximately 4-6 inches from the face of the burner, as measured by a thermocouple. The burner was positioned pointing up at a 45 degree angle with respect to the XPS panel face. In this configuration, the flame was applied to the test panel. A flame temperature of approximately 700° C. was used. This temperature was chosen to match the maximum façade flame temperature specified in the NFPA-285 test. A flame generated with the propane burner having a temperature of 700° C. was applied to the coated XPS test panel. According to this test, the coating showed good stability and remained intact and in place. No perforations or breaks were observed on either the hot or cold face of the XPS test panel for over 17 minutes of exposure. No smoke, combustion or flame spread were observed on the coated XPS test panel. Measurements using a FLIR camera (Forward Looking Infrared) show that the test had reached a steady state and a maximum temperature of 158° C. occurred on the cold face (face opposite the flame) during the test.

The same test as described above was conducted with an uncoated XPS test panel as received from the manufacturer. A flame generated with the propane burner having a temperature of 700° C. was applied to the uncoated XPS test panel. The panel immediately began to melt away from the flame, and flame breakthrough was observed 16 seconds after the onset of flame in response to a flame temperature of 700° C.

Example 3

A similar test as for Example 2 was conducted, but a flame temperature of 1100° C. was used. A 2'×2'×1" commercially available expanded polystyrene (XPS) panel was coated on both 2'×2' faces with a dual coating fire protective coating system. The first coating of the dual coating fire protective coating system was a RCF-based coating composition and the second coating of the dual coating fire protective system was an inorganic mineral layer including vermiculite platelets designated MICROLITE™ HTS from Dicalite Management Group/Specialty Vermiculite and allowed to dry for 24 hours at room temperature. The RCF-based coating composition was coated onto the surface of the XPS panel at about 450 gsm and the vermiculite coating was applied to the first coating at about 150 gsm. The XPS panel coated with the dual coating fire protective system was mounted vertically (i.e., with the primary face of the XPS panel facing vertical) for the fire testing. A 3" diameter propane burner was used in the fire tests to generate the flame. The flow of propane to the burner was adjusted with a flow controller device to give the target temperature approximately 4-6 inches from the face of the burner, as measured by a thermocouple. The burner was positioned pointing up at a 45 degree angle with respect to the XPS panel face. In this configuration, the flame was applied to the test panel. A flame temperature of approximately 1100° C. was used. This temperature is in excess of any façade temperatures specified in NFPA-285 and was chosen to pose an extreme challenge to the coated XPS test panel. A flame generated with the propane burner having a temperature of 1100° C. was applied to the coated XPS test panel. No perforations or breaks were observed on either the hot or cold face for over 15 minutes of exposure. No smoke, combustion or flame spread were observed on the coated panel. Measurements using a FLIR camera (Forward Looking Infrared) show that the test had reached a steady state and a maximum temperature of 303° C. occurred on the cold face (face opposite the flame) during the test.

The same test as described above was conducted with an uncoated XPS test panel as received from the manufacturer. A flame generated with the propane burner having a temperature of 1100° C. was applied to the uncoated XPS test panel. The panel immediately began to melt away from the flame, droplets of molten, flaming polystyrene were observed to drip from the panel in the flame area, and flame breakthrough was observed 6 seconds after the onset of flame.

Example 4

The following coating compositions in Table 1 were tested as described further below.

TABLE 1

COMPOSITIONS TESTED

| Coating Type | Water | Colloidal Silica | | VEEGUM® T Smectite Clay | VERSENE™ Solution[3] | Fiber | | |
|---|---|---|---|---|---|---|---|---|
| | | Nalco 1141 Colloidal SiO$_2$ Solution[1] | Nalco 1034a Colloidal SiO$_2$ Solution[2] | | | Ball Milled Isofrax® Fibers | Washed, Ball Milled Isofrax® Fibers | Ball Milled Fiberfrax® RCF |
| 1 | 11.2% | 35.0% | | 1.2% | | 52.6% | | |
| 2 | 11.2% | 35.0% | | 1.2% | | | 52.6% | |
| 3 | 8.2% | | 32.4% | 1.2% | 4.0% | 54.2% | | |
| 4 | 8.2% | | 32.4% | 1.2% | 4.0% | | 54.2% | |
| 5 | 11.2% | 35.0% | | 1.2% | | | | 52.6% |

[1]Nalco 1141 consists of 40 wt % SiO$_2$ solids and 60 wt % liquid (water). Specific Gravity 1.29
[2]Nalco 1034a consists of 34 wt % SiO2 solids and 66 wt % liquid (water). Specific gravity 1.23
[3]VERSENE™ solution consists of 45 wt % (NH$_4$)$_2$EDTA and 55 wt % water. Specific gravity is 1.20

The insulation foam panels tested consisted of polystyrene (XPS) and polyethylene (PE). In each test, 1'×1' panels were coated with varying weights (g/m$^2$ or gsm) of coating ranging from 0 (control) to approximately 450 gsm. The coating can also be applied at a coating weight of about 25 g/m$^2$ to about 800 g/m$^2$.

In some cases, a 25 μm aluminum foil facing weighing 53.8 g/m$^2$ (Reynolds Food Packaging, LLC) or a 38 μm aluminum foil facing weighing 103 g/m$^2$ (Ultra High Vacuum Aluminum Foil, McMaster-Carr Supply Co.) was attached to the panel face prior to coating and the coating applied over the foil facing. Coated foams were allowed to dry and were then subjected to specific temperature flames (700° C. or 1000° C.) for a period of up to 20 minutes. In one case, the flame exposure was extended to 60 minutes. Testing consisted of observing the coated panel under flame and noting the time required for the flame to penetrate into the face of the foam panel. The test was considered to have failed once the flame penetrated past the face-plane of the foam. The results are provided in Table 2 below. As can be seen, coatings applied over the foil facing all worked well and did not fail until after 20 minutes. The flames remained on the hot face side, with no penetration to the cold face.

TABLE 2

TESTING RESULTS

| | | Foam | | | | | | Time |
|---|---|---|---|---|---|---|---|---|
| Test# | Type | Density Lb/ft$^3$ | Thickness (in) | Al Foil Facing | Coating Type | Dry GSM | Flame Temp (° C.) | to Failure (min) |
| 1 | XPS | 1.81 | 1 | none | none | — | 700 | <0.5 |
| 2 | XPS | 1.81 | 1 | 25 μm | none | — | 700 | 0.5 |
| 3 | XPS | 1.81 | 1 | none | 5 | 280 | 700 | <0.5 |
| 4 | XPS | 1.81 | 1 | none | 5 | 280 | 1000 | <0.5 |
| 5 | PE | 2.19 | 2 | none | none | — | 700 | <0.5 |
| 6 | PE | 2.19 | 2 | 25 μm | none | — | 700 | 0.5 |
| 7 | PE | 2.19 | 2 | none | 5 | 128 | 700 | 2 |
| 8 | PE | 2.19 | 2 | none | 5 | 128 | 1000 | 1 |
| 9 | XPS | 1.81 | 1 | 25 μm | 1 | 105 | 1000 | >20 |
| 10 | XPS | 1.81 | 1 | 25 μm | 3 | 115 | 1000 | >20 |
| 11 | XPS | 1.81 | 1 | 25 μm | 2 | 95 | 1000 | >20 |
| 12 | XPS | 1.81 | 1 | 25 μm | 2 | 129 | 1000 | >20 |
| 13 | XPS | 1.81 | 1 | 25 μm | 4 | 177 | 1000 | >20 |
| 14 | XPS | 1.81 | 1 | 25 μm | 5 | 100 | 1000 | >20 |
| 15 | XPS | 1.81 | 1 | 25 μm | 1 | 93 | 1000 | >60 |
| 16 | PE | 2.19 | 2 | 25 μm | 1 | 115 | 1000 | >20 |
| 17 | PE | 2.19 | 2 | 25 μm | 3 | 102 | 1000 | >20 |
| 18 | PE | 2.19 | 2 | 25 μm | 2 | 108 | 1000 | >20 |
| 19 | PE | 2.19 | 2 | 25 μm | 4 | 128 | 1000 | >20 |
| 20 | PE | 2.19 | 2 | 38 μm | 1 | 117 | 1000 | >20 |
| 21 | PE | 2.19 | 2 | 25 μm | 5 | 128 | 1000 | >20 |

Example 5

Multiple sheets of 40 micron thick aluminum foil were coated on one face with varying amounts of the RCF mix composition of Table 1. The RCF mix composition was spray-coated onto the foil sheet using a standard pneumatic paint spray gun. Sheets were coated to varying degrees of coverage (expressed as grams coating per square meter) and allowed to dry. The dried sheets were positioned with the coated face vertical and a standard, propane-fueled blowtorch was used to direct a flame onto the coated face of the coated aluminum sheet. Test temperatures were varied by adjusting the distance from the blowtorch to the sheet.

The test consisted of applying a flame at a specific temperature and observing the sample (consisting of the coated foil) for cracking, spalling or perforation. If the sample survived the conditions for at least 20 minutes, it was considered to have passed.

The results are shown below in Table 3. Uncoated foil was able to survive 500° C. for 20 minutes, but failed when tested at 550° C. Foil with the heaviest coating survived at temperatures up to 950° C.

TABLE 3

20 MINUTE SURVIVAL TEMPERATURES FOR RCF COATING LEVELS

| | Coating Weight (grams/m$^2$) | | | |
|---|---|---|---|---|
| | 0 | 29.8 | 73.7 | 206.7 |
| Highest Passing Temperature (° C.) | 500 | 600 | 800 | 950 |

TABLE 3-continued

20 MINUTE SURVIVAL TEMPERATURES
FOR RCF COATING LEVELS

| | Coating Weight (grams/m²) | | | |
|---|---|---|---|---|
| | 0 | 29.8 | 73.7 | 206.7 |
| Failing Temperature (° C.) | 550 | 650 | 850 | 1000 |

Example 6

Multiple sheets of 40 micron thick aluminum foil were coated on one face with varying amounts of a mica-based coating, consisting of water, silicone elastomer, acrylic co-polymer, VEEGUM® T smectite clay and mica platelets. The mixture was spray-coated onto the foil sheet using a standard pneumatic paint spray gun. Sheets were coated to varying degrees of coverage (expressed as grams coating per square meter) and allowed to dry. The dried sheets were positioned with the coated face vertical and a standard, propane-fueled blowtorch was used to direct a flame onto the coated face of the coated aluminum sheet. Test temperatures were varied by adjusting the distance from the blowtorch to the sheet.

The test consisted of applying a flame at a specific temperature and observing the sample (consisting of the coated foil) for cracking, spalling or perforation. If the sample survived the conditions for at least 20 minutes, it was considered to have passed.

The results are shown below in Table 4. Uncoated foil was able to survive 500° C. for 20 minutes, but failed when tested at 550° C. Foil with the heaviest coating survived at temperatures up to 700° C.

TABLE 4

20 MINUTE SURVIVAL TEMPERATURES
FOR MICA COATING LEVELS

| | Coating Weight (grams/m²) | | | |
|---|---|---|---|---|
| | 0 | 12.9 | 24.7 | 73.7 |
| Highest Passing Temperature (° C.) | 500 | 600 | 700 | 700 |
| Failing Temperature (° C.) | 550 | 650 | 750 | 750 |

Although only a few exemplary embodiments have been described in detail above, those of ordinary skill in the art will readily appreciate that many other modifications are possible in the exemplary embodiments without materially departing from the novel teachings and advantages of the present invention. Accordingly, all such modifications are intended to be included within the scope of the present invention as defined in the following claims.

What is claimed is:

1. A fire protective composition consisting of:
   about 5 weight percent to about 40 weight percent of colloidal silica solids;
   about 0.5 weight percent to about 6 weight percent of a clay;
   about 30 weight percent to about 80 weight percent of a low biopersistence fiber;
   about 10 weight percent to about 70 weight percent of water; and
   greater than about 0 weight percent to about 7 weight percent of a chelating agent.

2. The fire protective composition of claim 1, wherein the chelating agent comprises ethylenediaminetetraacetic acid (EDTA).

3. The fire protective composition of claim 2, wherein the EDTA comprises diammonium EDTA.

4. The fire protective composition of claim 1, wherein the clay comprises smectite clay.

5. The fire protective composition of claim 1, wherein the low biopersistence fiber comprises a magnesia-silica fiber or a calcia-magnesia-silica fiber.

6. The fire protective composition of claim 1, wherein the low biopersistence fiber comprises unfiberized particulates.

7. A kit for providing a fire protective composition, the kit consisting of:
   (a) a colloidal silica solution;
   (b) a clay;
   (c) a low biopersistence fiber;
   (d) a chelating agent solution; and
   (e) instructions on how to mix components (a)-(d).

8. The kit of claim 7, wherein the chelating agent solution comprises ethylenediaminetetraacetic acid (EDTA).

9. The kit of claim 8, wherein the EDTA comprises diammonium EDTA.

10. The kit of claim 7, wherein the clay comprises smectite clay.

11. The kit of claim 7, wherein the low biopersistence fiber comprises a magnesia-silica fiber or a calcia-magnesia-silica fiber.

12. The kit of claim 7, wherein the low biopersistence fiber comprises unfiberized particulates.

13. A method for protecting a substrate from fire and excessive heat, comprising:
   providing a polymeric foam substrate;
   applying the fire protective composition of claim 1 on the polymeric foam substrate, and
   allowing the fire protective composition to dry on the polymeric foam substrate.

14. The method of claim 13, wherein the polymeric foam substrate comprises polystyrene, polyurethane, polyisocyanurate, phenolic, polyurea, low density polyethylene, high density polyethylene, polyvinylchloride, polypropylene, polytetrafluoroethylene, polyamide, polyimide, polyamideimide, polyester, polyetherketone, polyetheretherketone, polyetherketoneketone, polyvinylfluoride, polyaryl sulfone, polyester amide, polyester imide, polyethersulfone, polyphenylene sulfide, ethylene chlorotrifluoroethylene, polyethylene terephthalate, and acrylic polymers, and combinations thereof.

15. The method of claim 13, further comprising attaching a foil facing or a glass fiber cloth facing to the polymeric foam substrate before applying the fire protective composition, wherein the fire protective composition is applied directly on the foil facing or the glass fiber cloth facing.

16. The method of claim 15, wherein the foil facing has a thickness of about 10 to about 500 microns, and the glass fiber cloth facing has a thickness of about 25 to about 1000 microns.

17. The method of claim 13, wherein the fire protective composition is applied at a coating weight of about 25 g/m² to about 800 g/m².

18. A fire protective composition consisting of:
  about 5 weight percent to about 40 weight percent of colloidal silica solids;
  about 0.5 weight percent to about 6 weight percent of a clay;
  about 30 weight percent to about 80 weight percent of a low biopersistence fiber or a refractory ceramic fiber; and
  about 10 weight percent to about 70 weight percent of water.

19. The fire protective composition of claim 18, wherein the clay comprises smectite clay.

20. The fire protective composition of claim 18, wherein the low biopersistence fiber is present in the fire protective composition and comprises a magnesia-silica fiber or a calcia-magnesia-silica fiber.

21. A kit for providing a fire protective composition, the kit consisting of:
  (a) a colloidal silica solution;
  (b) a clay;
  (c) a low biopersistence fiber or a refractory ceramic fiber; and
  (d) instructions on how to mix components (a)-(c).

22. The kit of claim 21, wherein the clay comprises smectite clay.

23. The kit of claim 21, wherein the low biopersistence fiber is present in the fire protective composition and comprises a magnesia-silica fiber or a calcia-magnesia-silica fiber.

* * * * *